United States Patent [19]

Chavez, Jr. et al.

[11] Patent Number: 5,884,144

[45] Date of Patent: *Mar. 16, 1999

[54] MAINTENANCE AND ADMINISTRATION OF REMOTE SYSTEMS VIA RADIO PAGER

[75] Inventors: David Lee Chavez, Jr., Thornton; Jamie C. Su, Westminster, both of Colo.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 534,607

[22] Filed: Sep. 27, 1995

[51] Int. Cl.$^6$ .............................. H04Q 7/08; H04Q 7/10; H04Q 7/12

[52] U.S. Cl. ........................ 455/31.3; 455/31.2; 455/554; 455/560

[58] Field of Search ................................. 379/57, 58, 56; 340/825.44, 825, 311; 455/424, 560, 554, 31.3, 31.2

[56] References Cited

U.S. PATENT DOCUMENTS

| | | | |
|---|---|---|---|
| 4,922,518 | 5/1990 | Gordon et al. | 379/57 |
| 5,124,968 | 6/1992 | Mustonen | 340/825.44 |
| 5,398,280 | 3/1995 | MacConnell | 379/93 |
| 5,473,667 | 12/1995 | Neustein | 379/57 |
| 5,530,438 | 6/1996 | Bickham et al. | 340/825.44 |
| 5,555,297 | 9/1996 | Ochy et al. | 379/57 |

Primary Examiner—Wellington Chin
Assistant Examiner—Keith Ferguson
Attorney, Agent, or Firm—John C. Moran

[57] ABSTRACT

An integral radio pager within each remote switch of a switching system with all pagers in the remote switches sharing the same paging service number with respect to a public paging service. When a central processor that is controlling the operation of all remote switches performs a maintenance restart operation with respect to one of the remote switches, the central processor requests that the public paging service page the common service number. The central processor also provides the paging service a paging message that defines which remote switch is to respond to the page. Each integral pager is responsive to the page to interrupt an associated remote processor. In turn, each remote processor is responsive to the pager to examine the paging message and only responds if the remote processor finds its own identification number in the paging message. In addition, the remote switches can each have an integral cellular telephone circuit that share a common telephone number thereby reducing the cost of providing the cellular telephone service. When the central processor wants to establish a data communication link with the remote switch via a cellular telephone call, the central processor requests that the public paging service page the common service number and provides a paging message to the public paging service. The paging message defines the identification number of the remote switch that is to respond to the page. A remote processor is responsive to the paging message to set up a data call via the integral cellular circuit to the central processor.

16 Claims, 9 Drawing Sheets

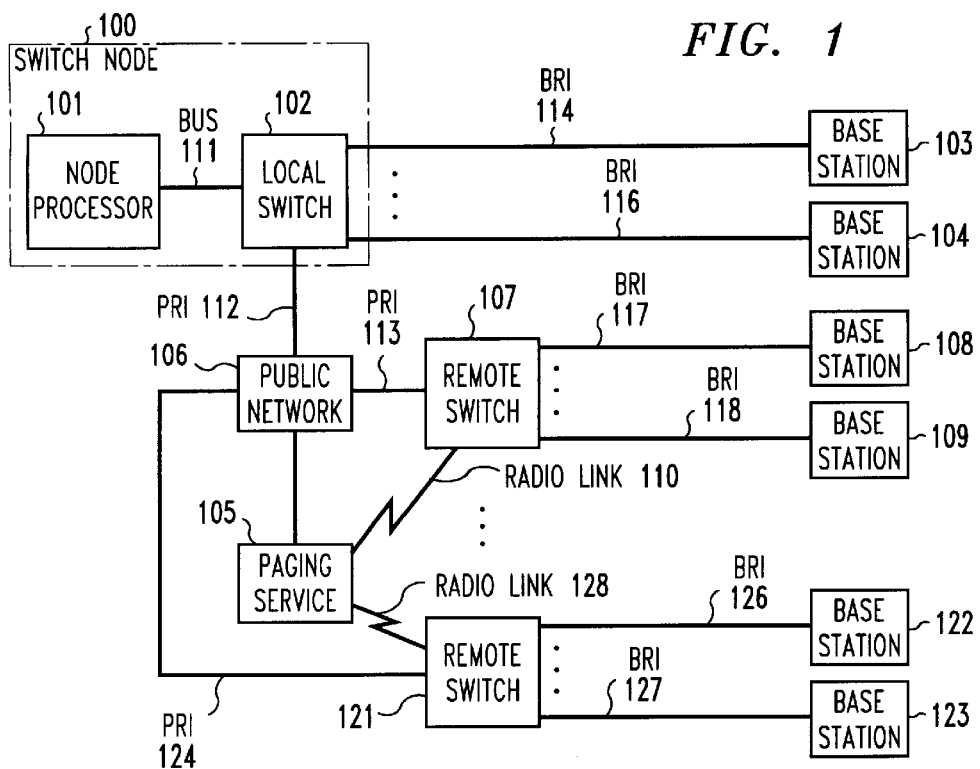
FIG. 1
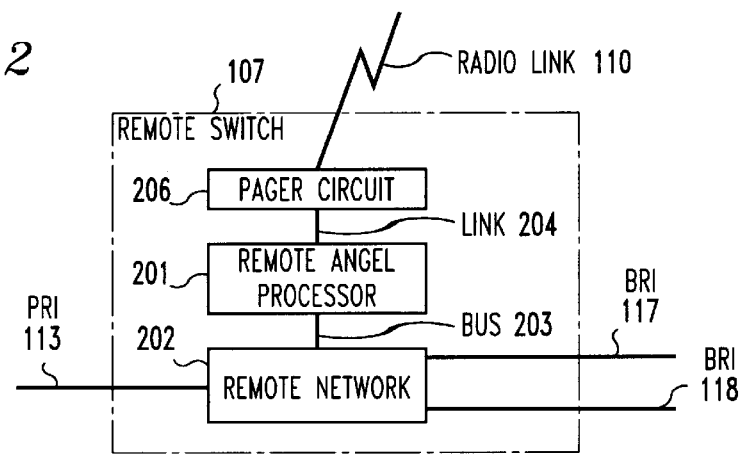
FIG. 2
FIG. 3
| | |
|---|---|
| 301 | REMOTE SWITCH ID NO. |
| 302 | PASSWORD |
| 303 | MESSAGE TYPE |
| 304 | MESSAGE OPCODE |
| 306 | MESSAGE LENGTH |
| 307 | MESSAGE |

MAINTENANCE AND ADMINISTRATION OF REMOTE SYSTEMS VIA RADIO PAGER

TECHNICAL FIELD

The invention relates generally to the administration and maintenance of remote computer systems, and specifically to the maintenance and administration of remote wireless telecommunications systems.

BACKGROUND OF THE INVENTION

In personal communication systems, PCS, there are a number of base stations each having the capacity to handle the telephone conversations from two to four PCS wireless handsets at a time. These base stations are connected to local and remote switches which are controlled by a central processor. The remote switches may be co-located with the central processor or may be interconnected to the central processor via the public network. The central processor directly controls the local switch. Each remote switch is controlled by a remote processor. In general, all maintenance and administration information is communicated to the remote processors via primary rate interface, PRI, links either directly or indirectly through the public network connected to the local switch and central processor. However, maintenance problems can occur in the remote switch that cannot be resolved by control information transmitted via the PRI links. In present PCS systems, there are only two options for resolving such maintenance problems. The first is to send a service technician to the site of the remote switch to manually perform the necessary restart operations. Another alternative is to have an independent telephone link to each remote switch from the central processor; whereby, the central processor can perform the restart operations via the independent telephone link.

The first solution suffers from the problems of high cost and inconvenience to users of the PCS wireless handsets while the remote switch is not functioning properly. The problem with the second solution is that in many countries it is difficult to get installation of telephone links. In addition, these telephone links are quite expensive. The expense becomes an important factor, since each remote switch may only handle a small number of base stations, and an individual base station can only provide service to two or four PCS handsets at any time.

This problem has not risen in cellular mobile telecommunications systems, since a base station in a cellular mobile telecommunications systems handles a large number of wireless handsets. The cost of providing an independent telephone link to a cellular mobile base station is insignificant in light of the high equipment costs of such a base station.

What is lacking in the prior art is a cost effective method for providing administration maintenance of remote systems.

SUMMARY OF THE INVENTION

This invention is directed to solving these and other shortcomings and disadvantages of the prior art. Illustratively according to the invention, each remote switch has an integral radio pager which is responsive to a commercial paging service; however, all pagers in the remote switches share the same paging service identification number. When a central processor that is controlling the operation of all remote switches performs a maintenance restart operation with respect to one of the remote switches, the central processor requests that the public paging service page the common service number. The central processor also provides the paging service a paging message that defines which remote switch is to respond to the page. Each integral pager is responsive to the page to interrupt an associated remote processor. In turn, each remote processor is responsive to the pager to examine the paging message and only responds if the remote processor finds its own identification number in the paging message. In addition, by utilizing the paging message, the central processor can perform a number of levels of maintenance restarts by the remote processor.

A second embodiment of the invention includes an integral cellular telephone circuit in each of the remote switches. Advantageously, these integral cellular telephone circuits share a common telephone number thereby reducing the cost of providing the cellular telephone circuit to the cost of the circuit itself for all practical purposes. In the second embodiment, when the central processor wants to establish a data communication link with the remote switch via a cellular telephone call, the central processor requests that the public paging service page the common service number and provides a paging message to the public paging service. The paging message defines the identification number of the remote switch that is to respond to the page. The remote processor is responsive to the paging message to set up a call via the integral cellular circuit to the central processor. Once the call is set up, the central processor and remote processor will then establish a data link overwhich communication takes place. The establishment of a data link allows the central processor to obtain data from the remote processor to more completely diagnose the state of the remote switch.

These and other advantages and features of the invention will become more apparent from the following description of an illustrative embodiment of the invention taken together with the drawing.

BRIEF DESCRIPTION OF THE DRAWING

FIG. 1 illustrates, in block diagram form, a wireless telecommunications system that incorporates an illustrative embodiment of the invention;

FIG. 2 illustrates, in block diagram form, the details of a remote switch;

FIG. 3 illustrates the format of the paging message transmitted by the paging service;

DETAILED DESCRIPTION

Figure 4:
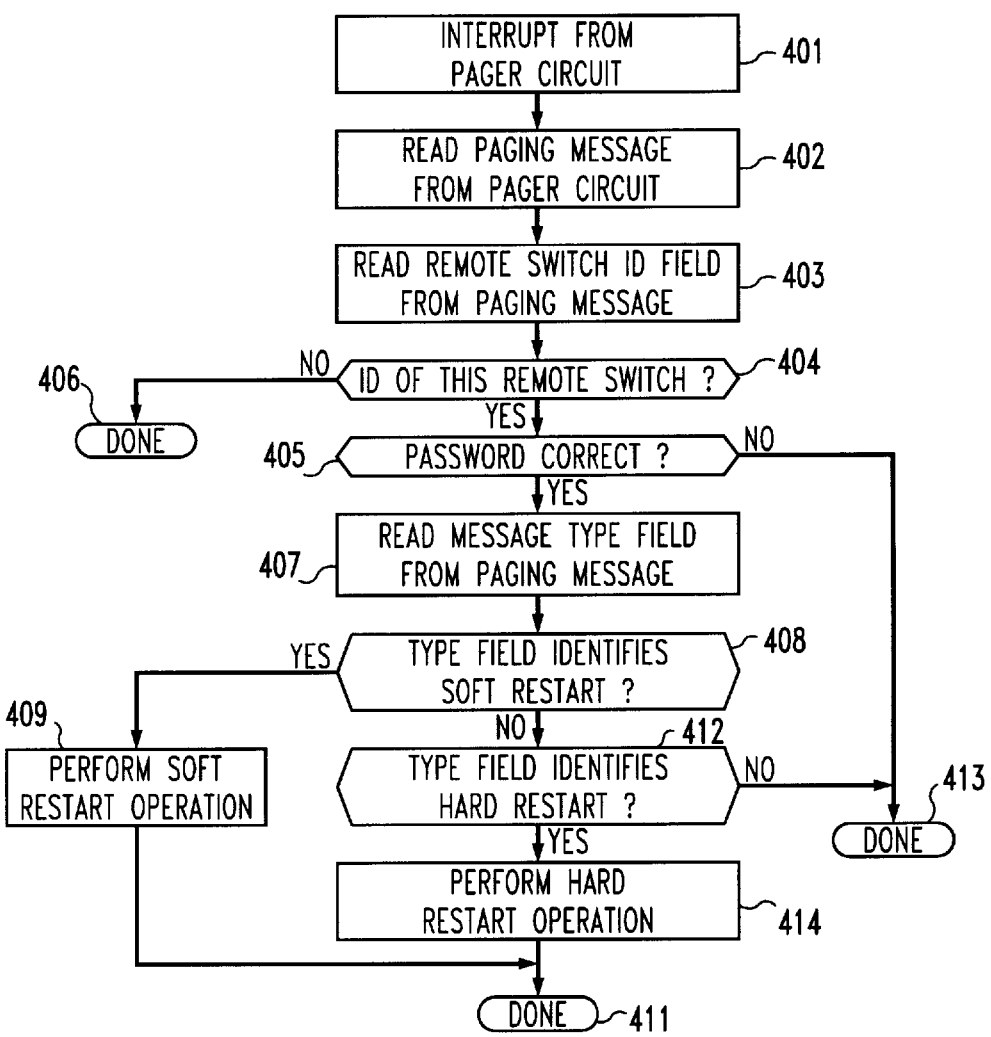
FIG. 4 illustrates, in flow chart form, the maintenance routine that is executed by a remote angel processor.

Switch node 100 provides overall control for a PCS system comprising a plurality of switches and base stations. Local switch 102 controls the operations of base stations 103–104, remote switch 107 controls the operations of base stations 108–109, and remote switch 121 controls the operation of base stations 122–123. Node processor 101 provides overall call control, maintenance, and administration of the local and remote switches and associated base stations. Local switch 102 is directly controlled by node processor 102. Remote switches 107–121 are controlled by node processor 101 via public network 106. The control of remote switches in this manner is described in detail in U.S. Pat. No. 5,182,750 which is hereby incorporated by reference. That patent also sets forth the manner in which node processor 101 controls the operations of the local switch. Greater details on the configuration of a remote switch such as remote switch 107 are set forth in U.S. Pat. No. 5,386,466 which is hereby incorporated by reference.

During normal operations, for example, node processor communicates maintenance and administration information to remote switch 107, utilizing PRI link 112, public network 106, and PRI link 113. However, if remote switch 107 enters a failure state whereby node processor 101 can not communicate with remote switch 107 over this normal path, node processor 101 establishes a call via local switch 102, PRI link 112, and public network 106 to paging service 105. Node processor 101 provides the common paging service number utilized by remote switches 107–121 along with a paging message. The paging message identifies remote switch 107 and the type of maintenance restart operation that is to be performed. Paging service 105 then transmits the paging service number and paging message via radio links 110 and 128. All integral pagers respond to the page; however, only the remote angel processor circuit within remote switch 107 responds to the paging message. In response to the page message, remote switch performs the level of restart operation specified in the paging message. Since the same paging service number is utilized by all the remote switches, the cost of providing this maintenance operation via paging service 105 is largely limited to the cost of the integral paging circuit within each remote switch.

FIG. 2 illustrates the details of remote switch 107. As described in U.S. Pat. No. 5,182,750, node processor 101 normally communicates with remote angel processor 201 via PRI link 113 and remote network 202. Remote network 202 not only includes a switching fabric but also interface cards for terminating PRI links and BRI links. Greater details of the individual components of remote angel processor 201 and remote network 202 are given in U.S. Pat. No. 5,386,466. However, remote angel processor 201 and remote network 202 can enter certain failure states in which node processor 101 cannot by communicating over PRI link 113 force remote angel processor 201 and remote network 202 out of these particular failure states. Further, the action taken for one failure state is often different from the action required for another failure state.

When remote angel processor 201 and remote network 202 are in such failure states, node processor 101 requests that a paging message be sent by paging service 105 to all of the remote switches. The format of this message is illustrated in FIG. 3. When this message is transmitted, pager circuit 206 is responsive to the paging service number to transmit a signal via link 204 to remote angel processor 201. That signal causes a hardware interrupt in remote angel processor 101 forcing remote angel processor 201 into a maintenance routine. The maintenance routine then reads the paging message from pager circuit 206 via link 204 and examines the paging message. If processor 201 finds the remote switch ID for remote switch 107 in the Remote Switch ID field of the message, processor 201 continues to process the paging message.

The maintenance program executing in remote angel processor 201 examines the Message Type field for the restart code and Message Opcode field to determine the type of restart that should be performed. There are two basic types of restart. A soft restart preserves all calls currently set up but drops all calls that are in the process of being set up. A hard reset performs a hardware reset of remote angel processor 201 and forces all of the PRI and BRI interfaces to an idle condition. A hard reset drops all calls and loses the information in call records. A maintenance application program executing a node processor 101 first tries to restart remote angel processor 201 with a soft restart. If the soft restart does not allow the maintenance application to establish communication with remote angel processor 201 via a PRI link, the maintenance application requests that the hard reset be performed on remote angel processor 201 and remote network 202.

FIG. 4 illustrates in detail the operations performed by the maintenance routine in a remote angel processor in responding to a paging message from paging service 105. Block 401 is responsive to the interrupt from the pager circuit to transfer control to block 402. The latter block reads the paging message from the pager circuit. Block 403 then reads the remote switch identification field from the paging message. Next, decision block 404 determines if the remote switch identification is that of the switch executing the maintenance routine. If the answer is no, control is transferred to block 406 which terminates operations with respect to the paging message. If the answer is yes in decision block 404, decision block 405 determines if the password in field 302 is correct. If the answer is no, control is transferred to block 413. If the answer is yes in decision block 405, block 407 reads the information in message type field 303, and decision block 408 determines if the type field identifies a soft restart. If the answer is yes in decision block 408, control is transferred to block 409 which performs a soft restart operation. If the answer is no in decision block 408, control is transferred to decision block 412 which determines if the type field identifies a hard restart. If the answer is yes, block 414 performs a hard restart operation before transferring control to block 411. If the answer in decision block 412 is no, processing is complete and control is transferred to block 413.

Figure 5:
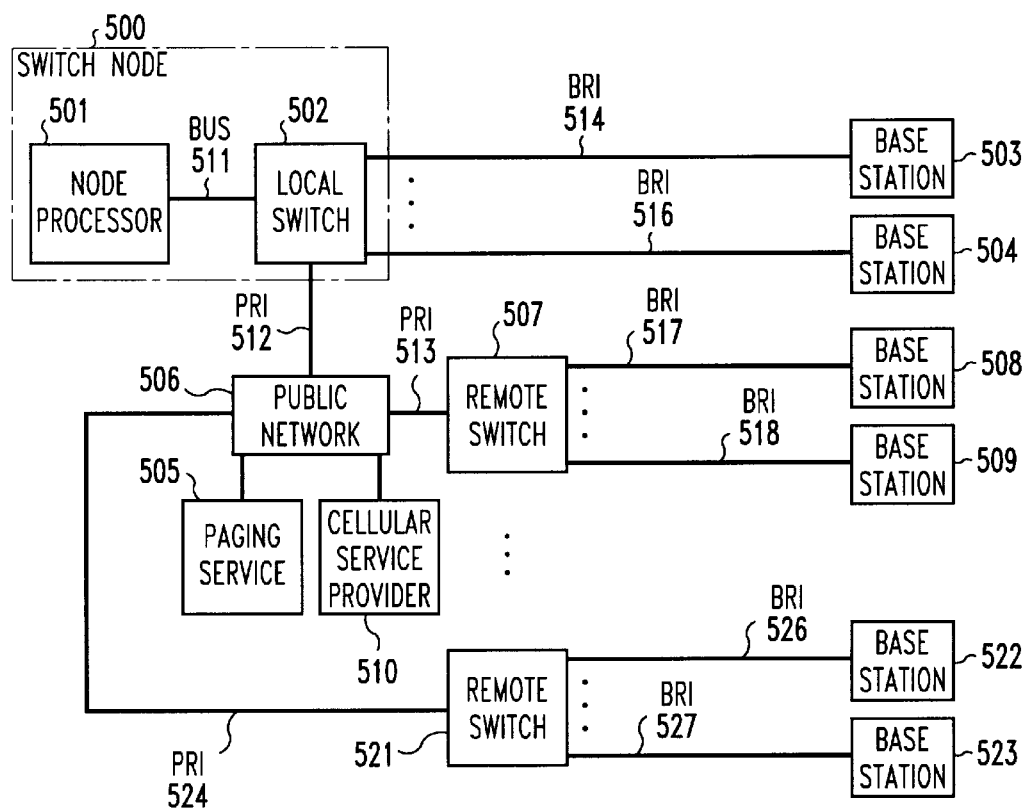
FIG. 5 illustrates, in block diagram form, a telecommunication system that incorporates a second embodiment of the invention.

FIG. 5 illustrates a second embodiment of the invention. In FIG. 5, switches 502, 507, and 521 are controlling a plurality of base stations 503–504, 508–509, and 522–523. Node processor 501 controls remote switches 507 and 521 via public network 506. When node processor 501 determines that a remote switch, such as remote switch 507 is in a state in which the remote switch cannot respond to node processor 501, node processor 501 requests that a paging message be transmitted by paging service 505. The Remote Switch ID field 301 of this paging message specifies remote switch 507. Upon receiving the paging message, remote switch 507 places a cellular call to node processor 501 via cellular service provider 510. In order to reduce the cost of providing the remote switches with cellular telephone capability, all remote switches share a single cellular telephone number. A remote switch will not try to place a cellular call unless requested to do so by node processor 501 via information in a paging message. Node processor 501 cannot place a cellular telephone call to the remote switches since the cellular circuit within a remote do not respond to incoming telephone calls.

Figure 6:
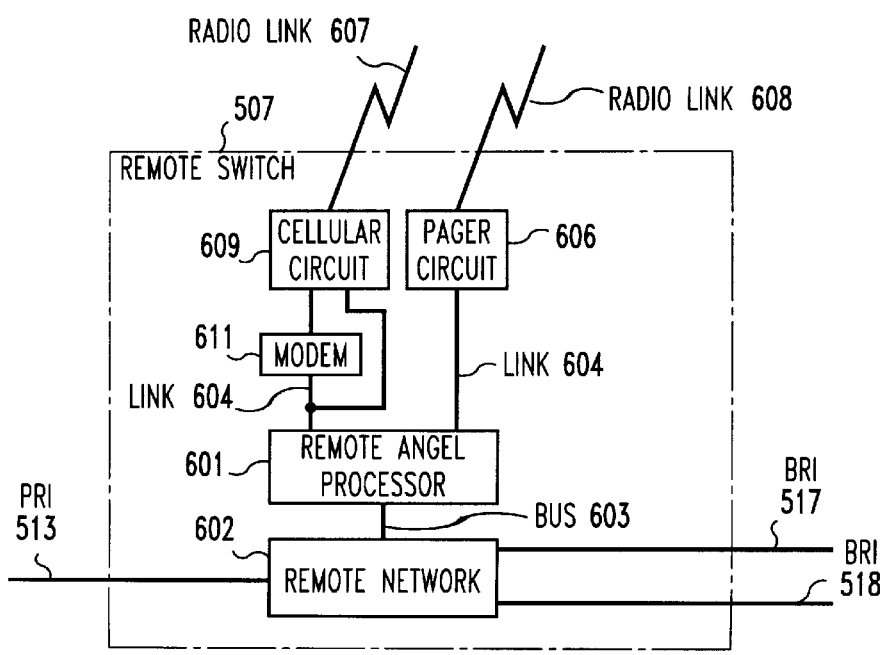
FIG. 6 illustrates, in block diagram form, the details of a remote switch for use with the second embodiment of the invention.

FIG. 6 illustrates in greater detail the internal construction of remote switch 507. When node processor 501 requests the transmission of a paging message that contains the identification code for remote switch 507, pager circuit 606 of FIG. 6 is responsive to this message to transmit an interrupt to remote angel processor 601. Remote angel processor 601 is responsive to the interrupt to determine from Remote Switch Identification field 301 that the message is for remote switch 107 and to execute a maintenance routine. The maintenance routine is responsive to the message type indicating a data call in the paging message to control cellular circuit 609 to place a cellular telephone call via cellular service 510 and public network 506 to node processor 501. Local switch 502 of FIG. 5 utilizes an internal modem to answer this call and to convert the modem signalling into messages that can be transferred to node processor 501 via bus 511. Once the telephone call is answered by a modem in local switch 502, modem 611 of FIG. 6 establishes the initial modem protocol signalling. After the data call is established between node processor 501 and remote angel processor 601, the maintenance application in node processor 501 request the transmission from the maintenance routine of remote angel processor 601 of data stored in remote angel processor 601. Utilizing this data, node processor 501 can further analyze the recovery strategy that should be utilized to bring remote switch 507 back into service.

Figure 7:
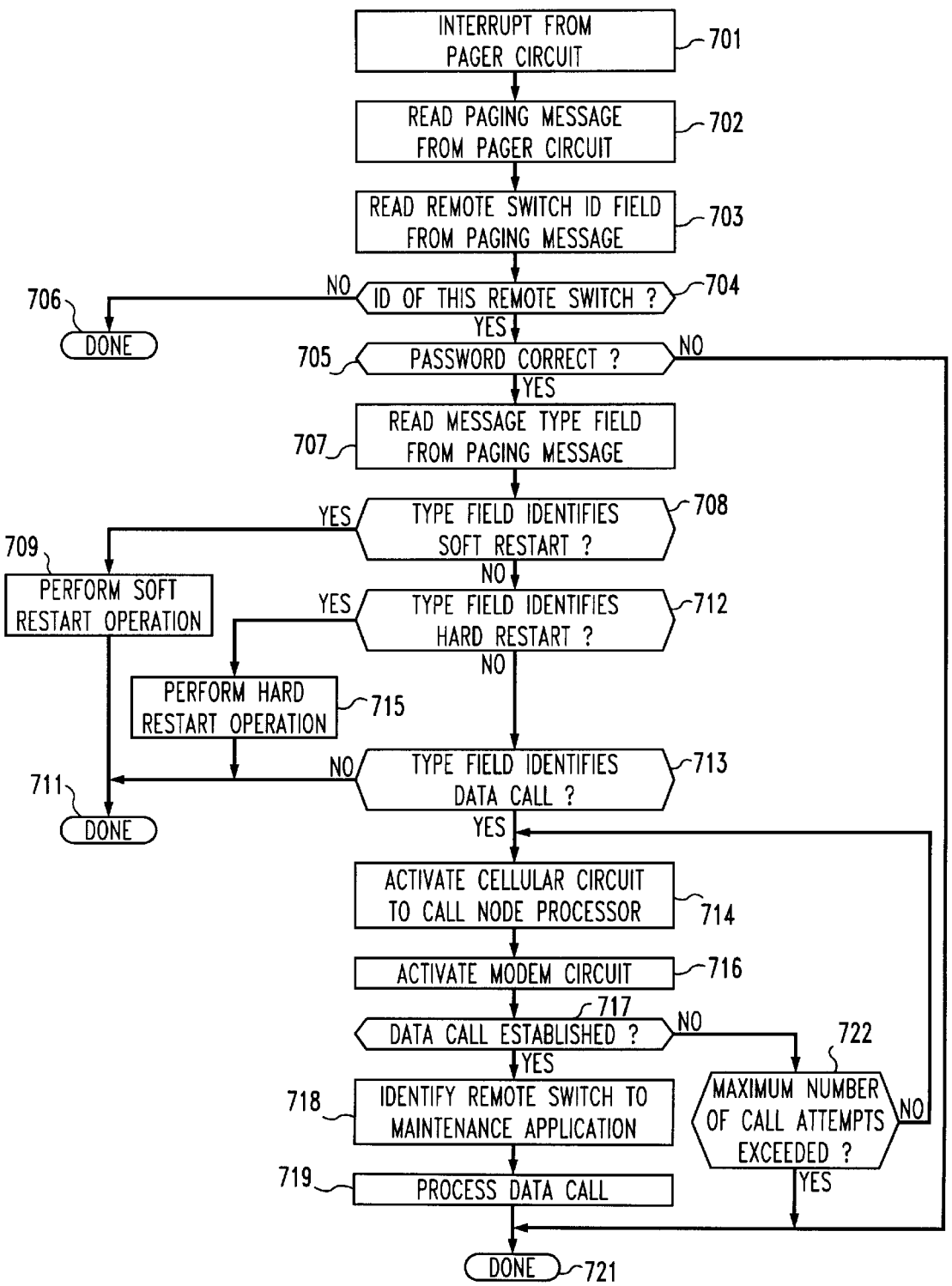
FIG. 7 illustrates, in flow chart form, the maintenance routine executed by a remote angel processor in the second embodiment.

FIG. 7 illustrates, in flow chart form, the operations performed by a remote maintenance routine executing in a remote angel processor in one of the remote switches illustrated in FIG. 5. Block 701 is responsive to an interrupt from the pager circuit to transfer control to block 702. The latter block reads the paging message from the pager circuit and transfers control to block 703. Block 703 reads the information in the remote switch ID number field 301. Decision block 704 determines if the identification number is that of the present remote switch that is executing the maintenance program. If the answer is no, control is transferred to block 706 and processing is terminated. If the answer is yes in decision block 704, control is transferred to decision block 705 which determines if the password in password field 302 is correct. If the answer is no, processing is terminated by transferring control to block 721. If the answer is yes in decision block 705, control is transferred to block 707.

Block 707 reads the contents of message type field 303 from the paging message. Decision block 708 determines if the type field identifies a soft restart. If the answer is yes, control is transferred to block 709 which performs the soft restart operation before terminating processing by transferring control to block 711. Returning to decision block 708, if the answer is no, decision block 712 determines if the type field identifies a hard start. If the answer is yes, control is transferred to block 715 which performs the hard restart operation and then, transfers control to block 711. If the answer is no in decision block 712, control is transferred to decision block 713 which determines if the type field identifies a data call. If the answer is no in decision block 713, processing is terminated by transferring control to block 711. If the answer is yes in decision block 713, control is transferred to block 714.

Block 714 activates the cellular circuit to place a call to node processor 501. After the call has been placed, block 716 activates the modem circuit to establish a data call with the modem connected to local switch 502. Decision block 717 determines if a data call has been established. If the answer is no, decision block 722 determines if the maximum number of call attempts has been exceeded. If the answer in 722 is no, control is transferred back to block 714 to attempt to set up a call to node processor 501. If the answer in decision block 722 is yes, processing is terminated by transferring control to block 721. Returning to decision block 717, if a data call has been established, control is transferred to block 718 which transmits identification information to the maintenance routine handling the data call in node processor 501. Block 719 is then executed to process the data call.

Figure 8:
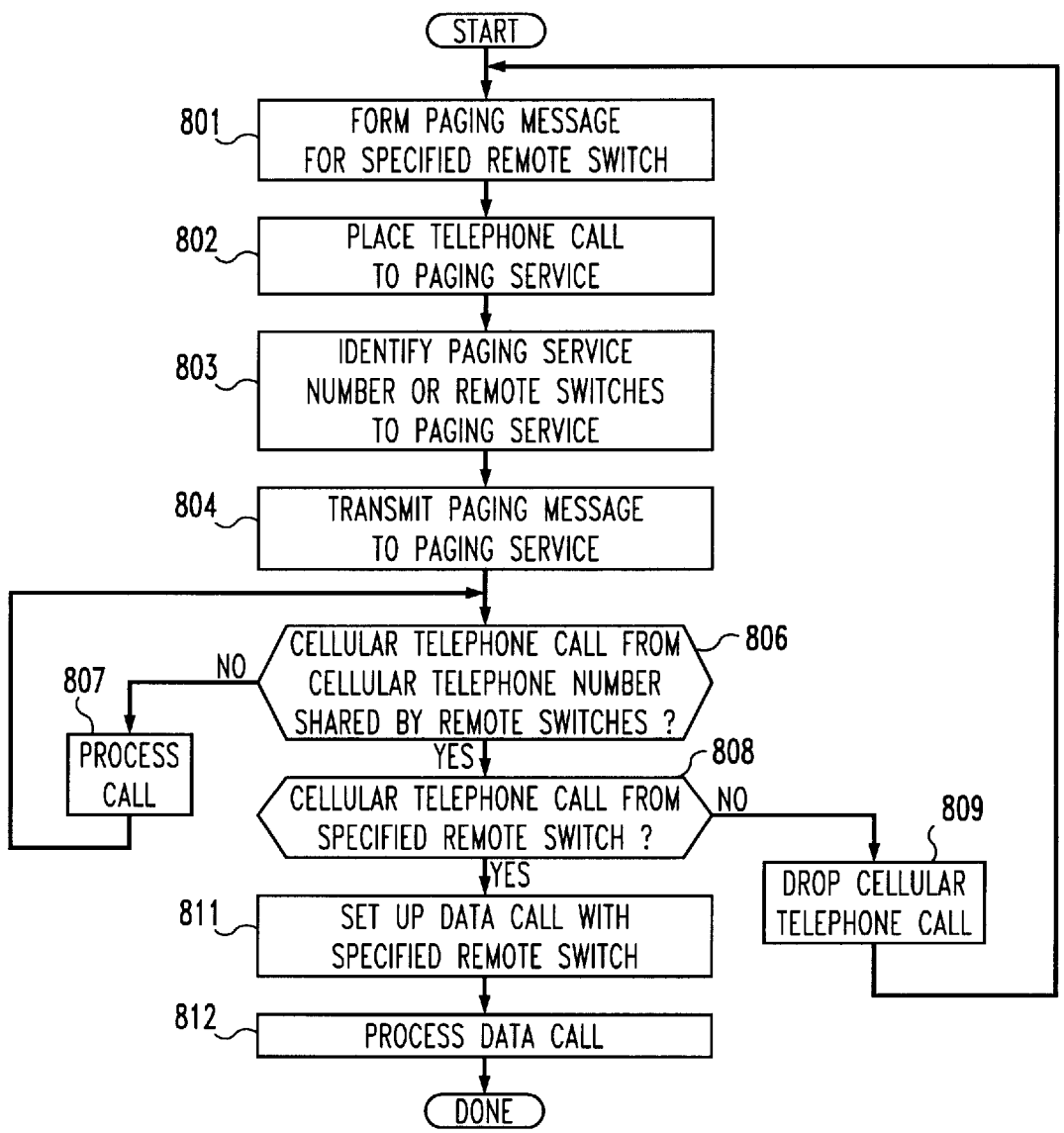
FIG. 8 illustrates, in flow chart form, the operations of a maintenance application in a node processor for the second embodiment.

FIG. 8 illustrates, in flow chart form, the operations performed by the maintenance application executing in node processor 501. When the maintenance routine determines that it is necessary to establish a cellular data call with a remote switch, block 801 is executed to form the paging message for the specified remote switch. Block 802 then places a telephone call to paging service 505, and block 803 identifies the paging service number utilized by all remote switches to paging service 505. Then, block 804 transmits the paging message to paging service 505. Control is then transferred to decision block 806 which determines when a cellular telephone call is received directed to the maintenance application in node processor 501. If a cellular telephone call is received which is not from the cellular telephone number shared by the remote switches, control is transferred to block 807 which processes the call and then returns control back to decision block 806. When a cellular telephone call is received from the cellular telephone number shared by the remote switches, decision block 808 is responsive to the identification information transmitted by the remote switch in block 718 of FIG. 7 to determine if that is the remote switch with which the maintenance application wishes to establish a data call.

If the answer is no in decision block 808, block 809 drops the cellular telephone call and returns control back to block 801. Block 801 attempts to once again establish the data call. If the answer in decision block 808 is yes, block 811 sets up the data call with the specified remote switch, and block 812 processes the data call.

Figure 9:
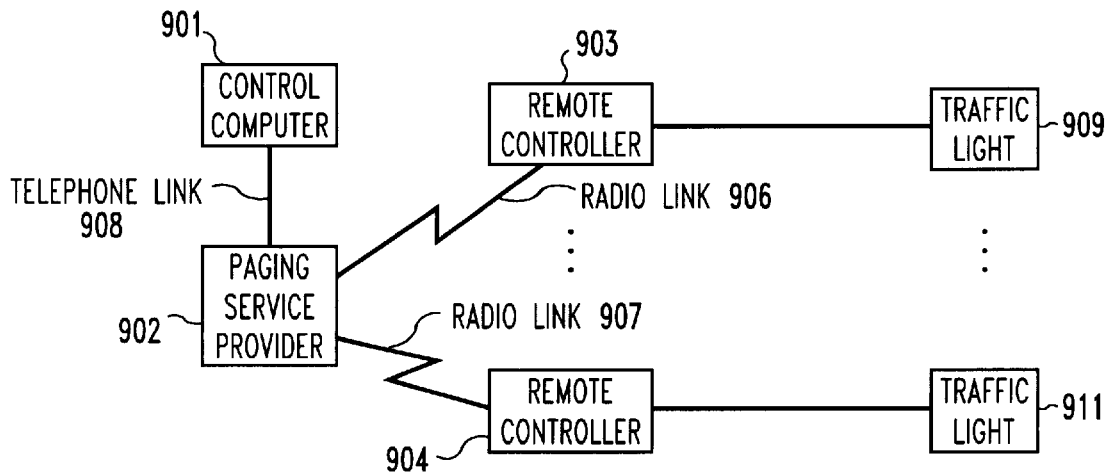
FIG. 9 illustrates, in block diagram form, a traffic light control system that incorporates the first embodiment of the invention.
Figure 10:
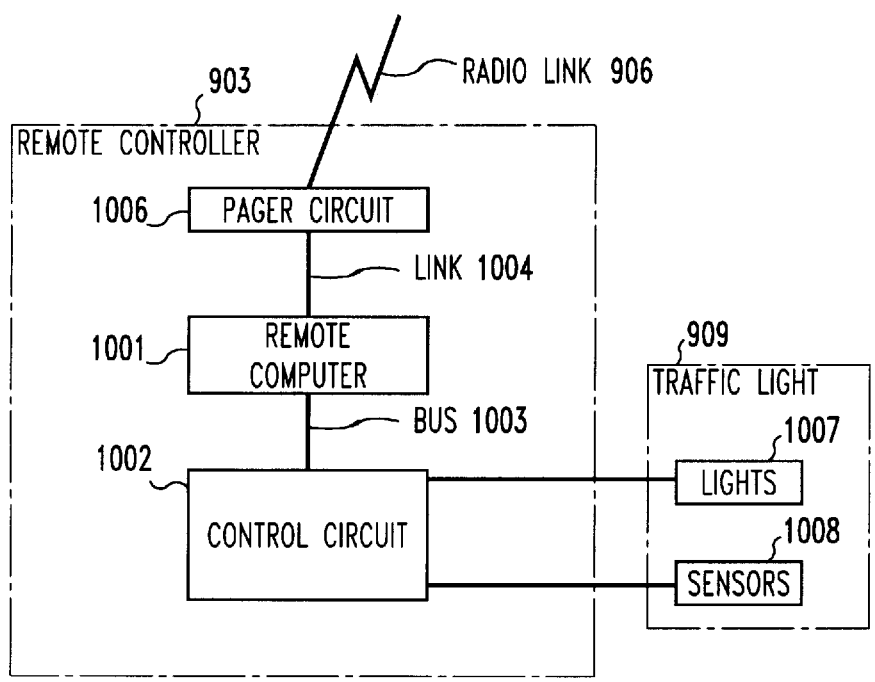
FIG. 10 illustrates, in block diagram form, the details of a remote controller.

FIG. 9 illustrates another application of the first embodiment. Remote controllers 903 through 904 are controlling traffic lights 909 through 911. As illustrated in FIG. 10, remote controller 903 is responsive to sensors 1008 to properly control lights 1007. Control circuit 1002 is under control of remote computer 1001. Remote computer 1001 contains the necessary algorithms to process information from sensors 1008 to proper control lights 1007. Remote computer 1001 is a stand alone unit and under normal operating conditions functions without outside help. From time to time, it is necessary to change the algorithms utilized by remote computer 1001. Control computer 901 of FIG. 9 does this by sending a paging message via paging service provider 902 to remote controller 903. Remote controllers 903 through 904 share a common paging service number. Paging circuit 1006 is responsive to the paging message from control computer 901 to transmit an interrupt to remote computer 1001. In response to the interrupt, remote computer 1001 identifies the identification code for remote controller 903 within the paging message. Message type field 303 of the paging message defines that the paging message is a data message and Message Length field 306 defines the number of bytes of the data message. Message field 307 of the paging message contains information to update the algorithms utilized by remote computer 1001. Note, that a number of paging messages may be required to transfer the necessary algorithmic information to remote computer 1001. The interaction between remote computer 1001 and pager circuit 1006 was described in greater detail with respect to pager circuit 206 and remote angel processor 201 of FIG. 2.

The second function for which control computer 901 utilizes the paging link into the remote controllers is to synchronize a group of traffic lights. When message type field 303 of the paging message indicates a synchronization operation, message opcode field 304 contains the group identification number for the group that is to perform the synchronization operation. In addition, message field 307 contains the time of day that the remote computers are to reset their internal timers to. A group would consist of a series of traffic lights controlling the flow of traffic on one street. Each remote computer has an internal timer for maintaining the time of day. However, over a period of time, these timers drift, and the time of day in each remote computer will be different. To correct this problem, control computer 901 sends out a message identifying a particular group of remote controllers. In addition, this message defines that the remote computers are to reset their internal clocks to a particular time of day. When the paging message is received, paging circuit 1006 immediately interrupts remote computer 1001. All remote computers then adjust their internal clocks at approximately the same time. The time variance is within the allowable amount that traffic lights can be out of synchronization with each other. The amount of time that paging service provider 902 takes in actually transmitting the paging message varies; however, all remote controllers receive this message at the same time. It is not critical that the remote computers have the exact time of day but rather that they be in synchronization with each other.

A third use that control computer 901 makes of the radio links is to restart an individual remote controller. When the operator of computer 901 receives a report that a traffic light is malfunctioning, the operator requests that control computer 901 restart the malfunctioning remote controller. The paging message that is transmitted by control computer 901 via paging service provider 902 addresses an individual remote controller and specifies that the remote controller is to perform a hard restart. After the remote computer within the remote controller has performed a hard reset, control computer 901 then transmits the group ID with the time-of-day information so as to bring all the remote controllers within a given group into time synchronization with each other.

Figure 11:
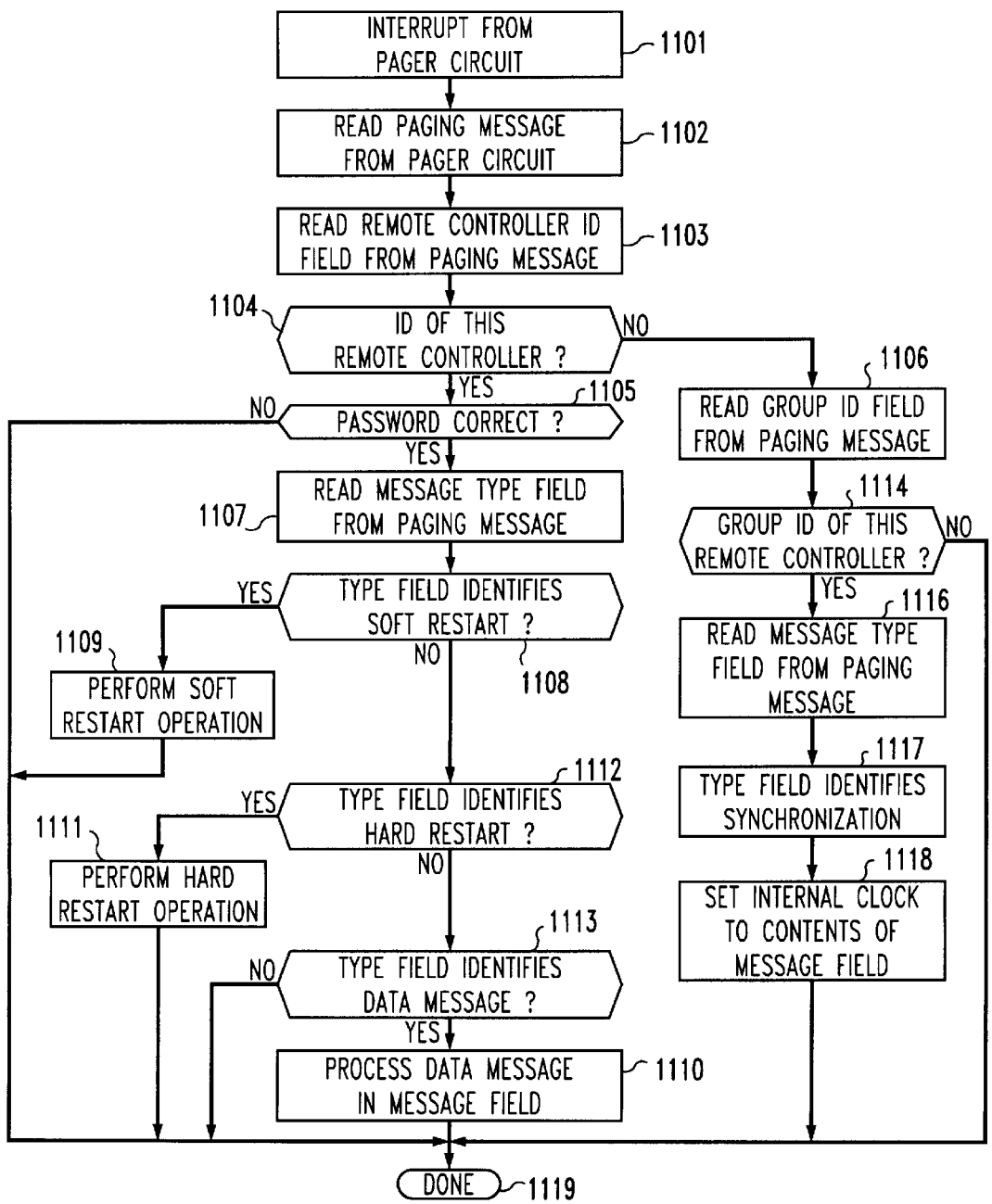
FIG. 11 illustrates, in flow chart form, the operations performed by a maintenance routine executed in a remore computer.

FIG. 11 illustrates, in flow chart form, the operations performed by a maintenance routine in a remote switch of FIG. 9. Block 1101 is responsive to an interrupt from the pager circuit to transfer control to block 1102. The latter block reads the paging message from the pager circuit and transfers control to block 1103. Block 1103 reads the remote controller identification field which is equivalent to field 301 of FIG. 3. Decision block 1104 then determines if the identification number is that of the remote controller executing the maintenance routine. If the answer is yes, control is transferred to decision block 1105 which determines if the password in field 302 is correct. If the answer is no in decision block 1105, processing is terminated by transferring control to block 1119. If the answer in decision block 1105 is yes, block 1107 reads the message type field from the paging message. Next, decision block 1108 determines if the type field identifies a soft restart. If the answer is yes, block 1109 performs a soft restart operation before terminating processing by transferring control to block 1119. If the answer in decision block 1108 is no, decision block 1112 determines if the type field in the equivalent of field 303 identifies a hard restart. If the answer is yes, block 1111 performs the hard restart operation before terminating processing by transferring control to block 1119. If the answer in decision block 1112 is no, decision block 1113 determines if the type field identifies a data message. If the answer is yes, block 1110 processes the data message in message field 307 utilizing the message length field 306. If decision block 1113 determines that there is not a data message to process, processing is terminated by transferring control to block 1119.

If the answer in decision block 1104 is that the remote controller's identification number is not in field 301 of the paging message, control is transferred to block 1106. The latter block reads the group identification field from the paging message. In FIG. 3, the group identification field takes the place of message opcode field 304. Decision block 1114 determines if the number in the group identification field is that of the present remote controller. If the answer is no, processing ceases. If the answer is yes, block 1116 reads message type field 303 from the paging message and determines if the type field identifies the synchronization operation by execution of decision block 1117. If the answer is yes in decision block 1117, block 1118 sets the internal clock equal to the contents of the message field before transferring control to block 1119. If the answer in decision block 1117 is no, processing is terminated by passing control to block 1119.

Figure 12:
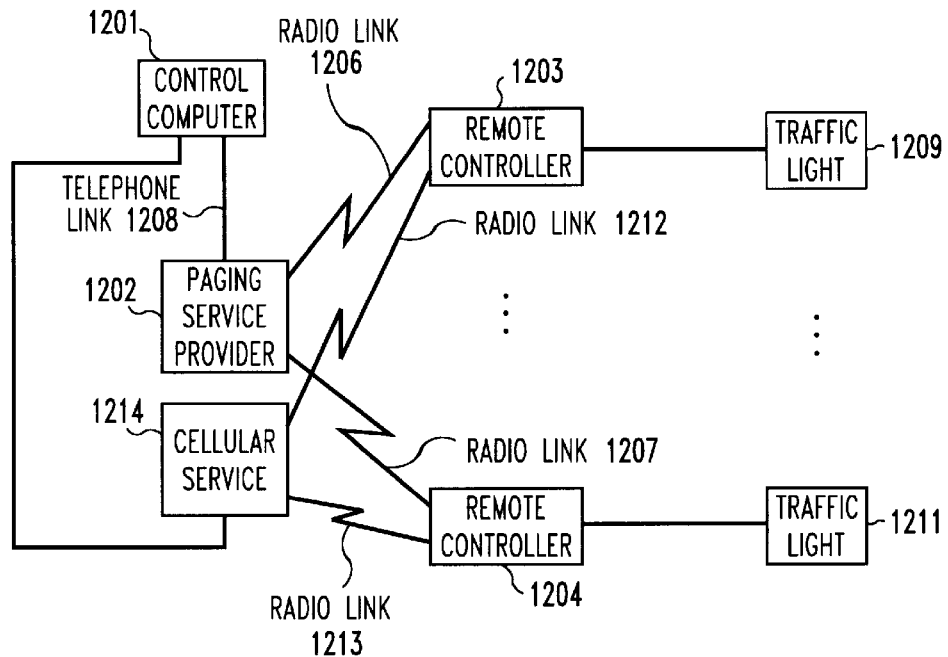
FIG. 12 illustrates, in block diagram form, a traffic light control system that incorporates the second embodiment of the invention.
Figure 13:
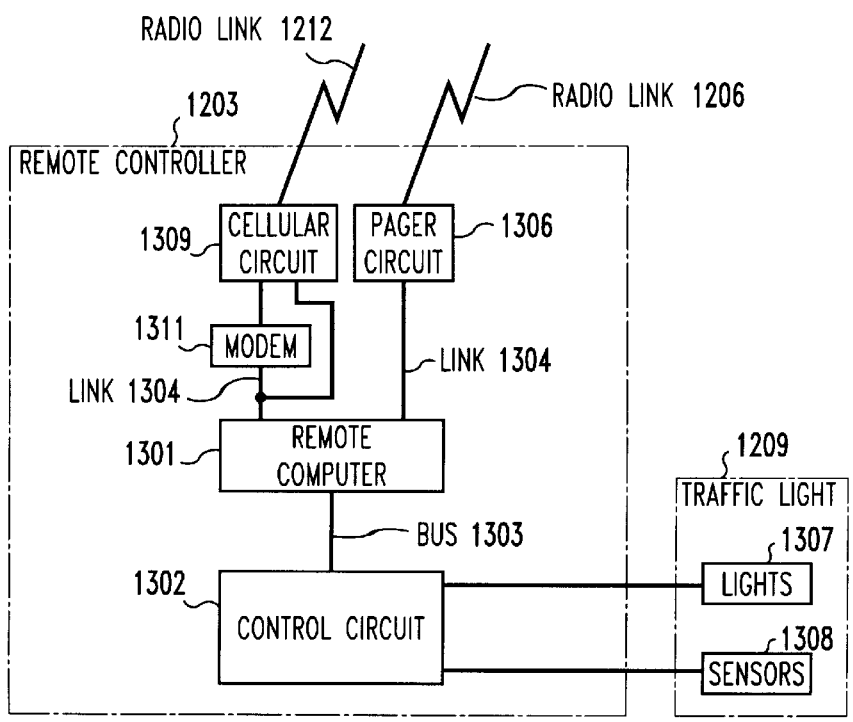
FIG. 13 illustrates, in block diagram form, the details of a traffic controller of FIG. 12.

FIGS. 12 and 13 illustrate the utilization of the second embodiment of the invention with respect to remote controllers controlling traffic lights. Each remote controller, such as remote controller 1203, as illustrated in FIG. 13, has a cellular circuit from which the remote controller can place outgoing calls. All the cellular circuits in the remote controllers share a common telephone number. During administration or the resetting of a remote controller, control computer 1201 transmits a paging message via paging service provider 1202 to an individual remote controller. The paging message requests that the remote computer within the remote controller place a call to control computer 1201. For example, after a data link has been established between control computer 1201 and remote computer 1301 of FIG. 13, control computer 1201 can read the necessary data from computer 1301 and determine the best way to do a restart operation and also whether it is necessary to send a service technician to the site of remote controller 1203. During administration, the data link established between remote computer 1301 and control computer 1201 allows control computer 1201 not only to transfer administration information at a higher rate to remote computer 1301 but also to verify that the information was received by remote computer 1301.

Figure 14:
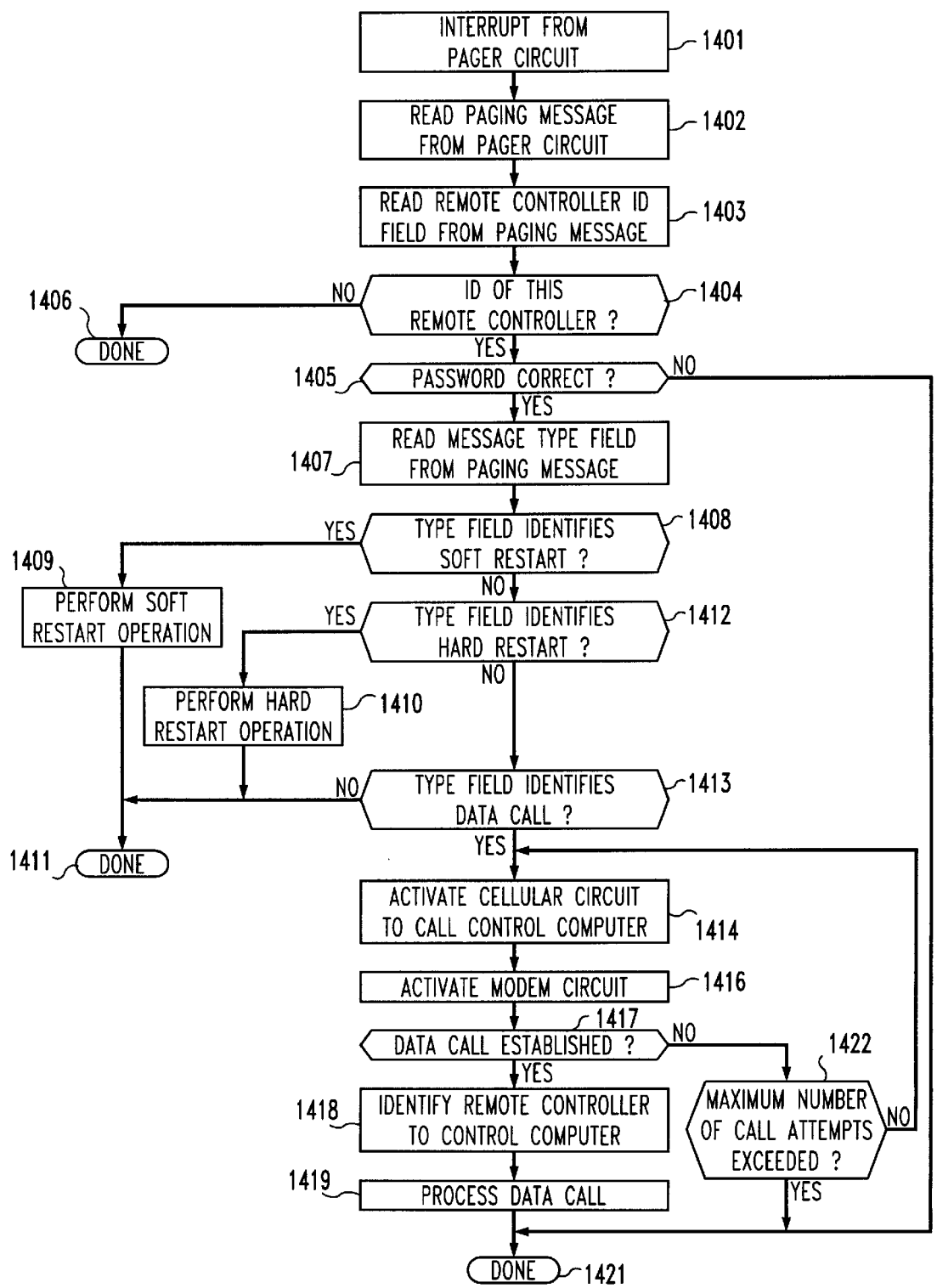
FIG. 14 illustrates, in flow chart form, a program executed in a remote computer of FIG. 13.

FIG. 14 illustrates, in flow chart form, the program executed in a remote computer of a remote controller of FIG. 12 in responding to a paging message transmitted by control computer 1201 via paging service 1202. Block 1401 is responsive to an interrupt from the pager circuit to transfer control to block 1402 which reads the paging message from the pager circuit. Block 1403 reads the remote controller ID field which is equivalent to field 301 from the paging message, and decision block 1404 determines if the remote controller ID is the ID of the present remote controller. If the answer is no, processing is terminated by execution of block 1406. If the answer is yes, decision block 1405 determines if the password in password field 302 is correct. If the answer is no, further processing is terminated by transferring control to block 1421. If the answer in decision block 1405 is yes, block 1407 reads the message type from message type field 303 and control is passed to 1408. Decision block 1408 determines if the type field identifies a soft restart. If the answer is yes, block 1409 performs a soft restart operation before terminating processing by transferring control to block 1411. If the answer in decision block 1408 is no, decision block 1412 determines if the type field identifies a hard restart. If the answer is yes, block 1410 performs a hard restart operation and then transfers control to block 1411. If the answer in decision block 1412 is no, decision block 1413 determines if the type field identifies a data call operation. If the answer is no, processing is terminated by transferring control to block 1411. If the answer in decision block 1413 is yes, control is transferred to block 1414.

Block 1414 activates the cellular circuit to make a cellular call to control computer 1201. Block 1416 activates the modem circuit on the call being set up so as to establish a data call when the call is answered by a modem connected to control computer 1201. Decision block 1417 determines when the data call has been established. If a data call has not been established, decision block 1422 determines if the maximum number of call attempts exceeds a predefined value. If the answer is no, control is transferred back to block 1414. If the answer in decision block 1422 is yes, processing is terminated by transferring control to block 1421. If the answer in decision block 1417 is that a data call has been established, block 1418 transmits the identity of the remote controller to control computer 1201. Block 1419 then processes the data call.

It is to be understood that the above-described embodiments are merely illustrative of the principles of the invention and that other arrangements may be devised for those skilled in the art without departing from the spirit and scope of the invention. In particular, one skilled in the art could readily envision other applications of the embodiments in addition to remote wireless switches or traffic lights.

The invention claimed is:

1. A method of communicating information with remote units and each remote units having a remote processor, pager circuit, and a wireless circuit, the method comprising the steps of:

assembling a paging message comprising an identification number of one of the remote units by a central computer;

transmitting a paging identification number of the remote units and the paging message by the central computer via a paging system whereby the paging identification number is common to all of the remote units;

receiving the paging identification number and the paging message by the pager circuits in the remote units;

communicating the paging message to the remote processors controlling the remote units by the pager circuits; and establishing a wireless data telephone call via a wireless switching system to the central computer by one of the remote processors controlling the one of the remote units using the wireless telephone circuit in the one of the remote units upon the one of the remote processors recognizing the identification number of the one of the remote units wherein all of the wireless telephone circuits share one wireless telephone number and only a single one of all of the wireless telephone circuits in all of the remote units can place and be active on a wireless telephone call at any time.

2. The method of claim 1 further comprises the step of exchanging information by the one of the remote processors and central computer via the wireless data telephone call.

3. The method of claim 2 wherein the step of exchanging comprises transferring time of day information from the central computer to the one of the remote processors.

4. A method of communicating information with remote switches and each remote switches having a remote processor, pager circuit, and wireless telephone circuit and providing wireless service for wireless telephones via a plurality of base stations, and a switch node having a switching network and a node processor for controlling the switch node, and the remote switches interconnect to the switch node by telephone s the method comprising the steps of:

assembling a paging message comprising an identification number of one of the remote switches by a node processor;

transmitting a paging identification number of the remote switches and the paging message by the node processor via a paging system whereby the paging identification number is common to all of the remote switches;

receiving the paging identification number and the paging message by the pager circuits in the remote switches;

communicating the paging message to the remote processors controlling the remote switches by the pager circuits; and establishing a wireless data telephone call to the node processor via a wireless switching system and the switching network of the switch node by one of the remote processors controlling the one of the remote switches using the wireless telephone circuit in the one of the remote switches upon the one of the remote processors recognizing the identification number of the one of the remote switches wherein all of the wireless telephone circuits share one wireless telephone number and only a single one of all of the wireless telephone circuits can place and be active on a wireless telephone call at any time.

5. The method of claim 4 further comprises the step of exchanging information by the one of the remote processors and node processor via the wireless data telephone call.

6. The method of claim 5 wherein the step of exchanging comprises transferring administration information from the node processor to the one of the remote processors.

7. The method of claim 5 wherein the step of exchanging comprises transferring maintenance information from the one of the remote processors to the node processor.

8. The method of claim 7 further comprises the steps of determining by the node processor a type of initialization that should be performed by the one of the remote processors;

transmitting the type of initialization to the one of the remote processors by the node processor via the wireless data telephone call; and performing the type of initialization by the one of the remote processors.

9. An apparatus for receiving information by remote units and each remote units having a remote processor, pager circuit, and wireless telephone circuit, comprising:

a central computer transmitting a paging identification number of the remote units and a paging message via a paging system to the remote units whereby the paging identification number is common to all of the remote units;

the pager circuits in the remote units receiving the paging identification number and the paging message wherein the paging message having an identification number of one of the remote units;

the pager circuits further communicating the paging message to the remote processors controlling the remote units in response to the paging identification number which common to all remote units; and one of the remote processors controlling the one of the remote units using the wireless telephone circuit in the one of the remote units for establishing a wireless data telephone call via a wireless switching system to the central computer upon the one of the remote processors recognizing the identification number of the one of the remote units wherein all of the wireless telephone circuits share one wireless telephone number and only a single one of all of the wireless telephone circuits can place and be active on a wireless telephone call at any time.

10. The apparatus of claim 9 further comprises the one of the remote processors and central computer exchanging information via the wireless data telephone call.

11. The apparatus of claim 10 wherein the exchanging comprises transferring time of day information from the central computer to the one of the remote processors.

12. An apparatus for communicating information with remote switches and each remote switches having a remote processor, pager circuit, and wireless telephone circuit and providing wireless service for wireless telephones via a plurality of base stations, and a switch node having a switching network and a node processor for controlling the switch node, and the remote switches interconnect to the switch node by telephone links, comprising:

the node processor assembling a paging message comprising an identification number of one of the remote switches;

the node processor further transmitting a paging identification number of the remote switches and the paging message via a paging system whereby the paging identification number is common to all of the remote switches;

the pager circuits in the remote switches receiving the paging identification number and the paging message;

the pager circuits further communicating the paging message to the remote processors controlling the remote switches; and one of the remote processors controlling the one of the remote switches establishing a wireless data telephone call to the node processor via a wireless switching system and the switching network of the switch node using the wireless telephone circuit in the one of the remote switches upon the one of the remote processors recognizing the identification number of the one of the remote switches wherein all of the wireless telephone circuits share one wireless telephone number and only a single one of all of the wireless telephone circuits can place and be active on a wireless telephone call at any time.

13. The apparatus of claim 12 further the one of the remote processors and node processor exchanging information via the wireless data telephone call.

14. The apparatus of claim 13 wherein the exchanging comprises transferring administration information from the node processor to the one of the remote processors.

15. The apparatus of claim 13 wherein the exchanging comprises transferring maintenance information from the one of the remote processors to the node processor.

16. The apparatus of claim 15 further the node processor determining a type of initialization that should be performed by the one of the remote processors;

the node processor further transmitting the type of initialization to the one of the remote processors via the wireless data telephone call; and the one of the remote processors further performing the type of initialization.

* * * * *